United States Patent [19]

Black

[11] 3,856,139

[45] Dec. 24, 1974

[54] CARRIER MEANS FOR AUTOMATICALLY DRIVEN FASTENERS

[76] Inventor: Hugh Black, c/o Woodloc Incorporated, Liner Cove Rd. Box 556, Waynesville, N.C. 28786

[22] Filed: Sept. 8, 1972

[21] Appl. No.: 287,542

Related U.S. Application Data

[63] Continuation-in-part of Ser. No. 869,837, Oct. 27, 1969, Pat. No. 3,693,863.

[52] U.S. Cl. .............................. 206/340, 206/493
[51] Int. Cl. .......................................... B65d 79/00
[58] Field of Search............ 206/56 DF, 65 K, 46 H, 206/65 R, 340, 493; 85/11; 161/139, 122

[56] References Cited
UNITED STATES PATENTS

| | | | |
|---|---|---|---|
| 23,031 | 2/1859 | Kinsey | 206/65 R |
| 291,704 | 1/1884 | Felch | 206/65 R |
| 409,546 | 8/1889 | Zeigler | 85/11 UX |
| 496,625 | 5/1893 | Tuttle | 85/11 |
| 2,062,098 | 11/1936 | MacChesney | 206/65 K |
| 2,397,743 | 2/1946 | Kaphan | 161/139 X |
| 2,917,723 | 12/1959 | Gluck | 206/65 K X |
| 2,928,165 | 3/1960 | Carlzen et al. | 206/65 K UX |
| 2,939,147 | 6/1960 | Jacobson | 206/46 H |
| 3,032,767 | 5/1962 | Weiss et al. | 206/56 DF |
| 3,550,768 | 12/1970 | Briggs | 206/65 R |
| 3,618,446 | 11/1971 | Black | 206/56 DF X |

*Primary Examiner*—Leonard Summer
*Attorney, Agent, or Firm*—Alter, Weiss Whitesel & Laff

[57] ABSTRACT

A fastener adapted for mounting on a carrier rod for transporting automatically driven fasteners and for use in the magazine of the tools that automatically drive the fasteners.

4 Claims, 10 Drawing Figures

PATENTED DEC 24 1974

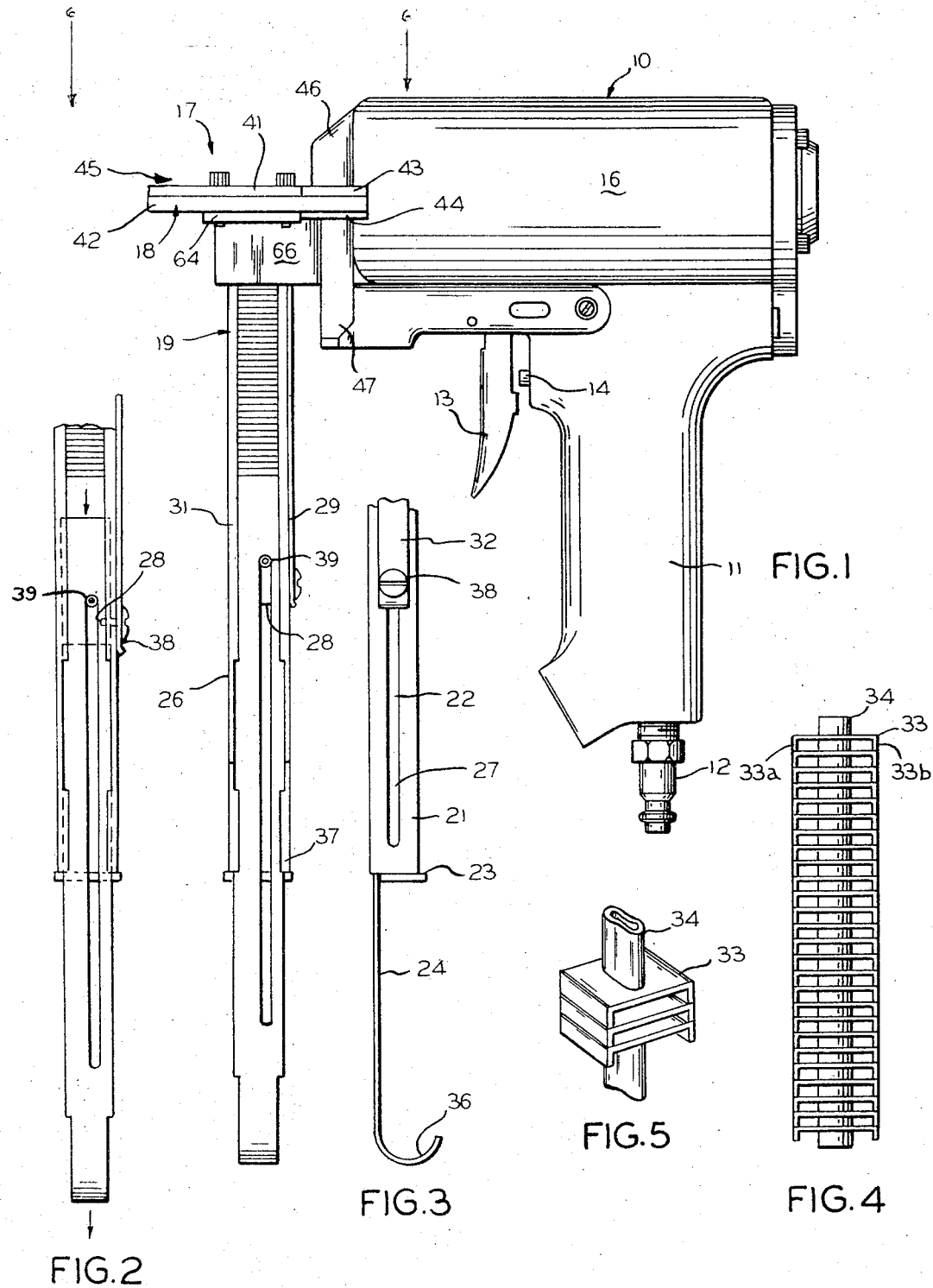

3,856,139

CARRIER MEANS FOR AUTOMATICALLY DRIVEN FASTENERS

This application relates to unique fasteners and to fastener carrier devices for use with driving tools that automatically drive the unique fasteners. This is a continuation-in-part of my application, Ser. No. 869,837, filed on Oct. 27, 1969, entitled "TOOL ATTACHMENT FOR AUTOMATICALLY APPLYING FASTENERS," which issued as U.S. Pat. No. 3,693,863 on Sept. 26, 1972.

Many types of fasteners have been devised for furniture fabrication, for example, wherein the final product is made of either wood, plastic or the like. One difficulty with various types of fasteners was automating the use of the fasteners.

The most readily thought of example of automatic fastener equipment, of course, is the stapler, wherein a plurality of fasteners are held in a magazine of a gun-type device for easily dispensing the fasateners to perform the fastening function. The stapler has proven practical because the staples themselves come joined together in a strip so that the problems of transporting the fasteners and loading them into a magazine is minimized.

The problem of using the automatic gun-type device; however, is made unduly complicated when the fastener used is not inherently jointed together during the production of the fasteners. I have overcome the difficulty of using wood fasteners in the automatic gun-type device by providing a carrier for use with the gun or the like. The carrier serves for transporting the fasteners and for use with the gun is automatically driving the unique fasteners.

Accordingly, it is an object of this invention to provide a carrier for use with fasteners in an automatic driving device to enable the automatic application of the fasteners.

A related object of this invention is to provide improvements in the fasteners to facilitate their use with the carrier disclosed herein.

Another object of the invention is to provide the means for transporting the fasteners which means avails itself of loading the fasteners in the magazine of the driving device.

In accordance with one preferred embodiment of the invention carrier rod means are provided for carrying a series of fasteners in a manner enabling their transportation and consequent positioning on a one at a time basis, in an air gun or the like, for automatically driving the fastener into the objects to be fastened together. An opening is provided to enable the fastener to fit onto the carrier. The opening has a notched section which facilitates loading the fasener onto the carrier.

The foregoing and other objects and advantages of this invention and the manner of obtaining them will become more apparent and the invention itself will be better understood by reference to the following description of an embodiment of the invention taken in conjunction with the accompanying drawings, wherein:

FIG. 1 is a side view of an automatic drive tool, such as an air gun, having a fastener guide means attached thereto for utilization of the carrier and fateners loaded thereon;

FIG. 2 is a side view of the magazine portion of the fastener guide means showing a follower slightly removed from the fasteners;

FIG. 3 is a rear view of the magazine showing the attachment of spring means to the follower;

FIG. 4 is a rear view of the fastener carrier having the fasteners mounted thereon;

FIG. 5 is a perspective view of the carrier of FIG. 4 to more clearly show the preferred shape of the carrier.

Figure 6:
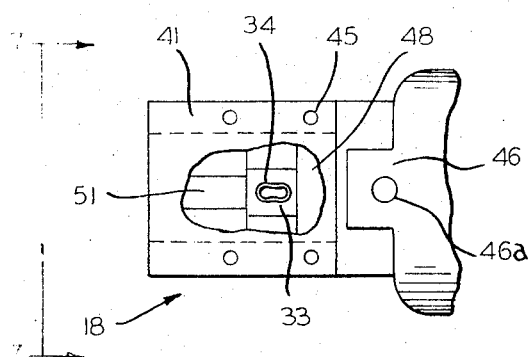
FIG. 6 is a view taken along the lines 6—6 of FIG. 1 looking in the direction of the arrows with the cover plate of the nose structure of the fastener guide means partially broken away.
Figure 7:
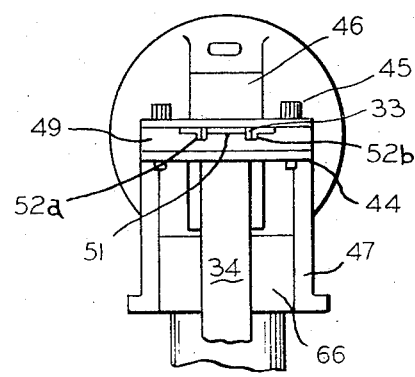
FIG. 7 is a view of the nose structure mounted in a gun taken along the line 7—7 of FIG. 6 looking in the direction of the arrows.

Similar characters of reference indicate corresponding parts throughout the various views. Referring now to the same, the automatic driving mechanism is shown in FIG. 1 as an air gun 10. The gun 10 is comprised of a handle section 11 having a coupling attachment 12 for coupling an air hose thereto. Adjacent to the handle section is a trigger 13 which when depressed in turn pushes against a plunger 14 to operated a valve (not shown) which actuates the driver (not shown) in the drive piston portion 16 of the air gun.

A fasatener guide means 17 is shown attached to the air gun 10. The fastener guide means comprises nose structure means 18 for selectively directing the fasteners into the pieces being joined together.

Means are provided for storing the fasteners in a dispensible condition such as magazine means 19 which is disposed from the nose structure means. The magazine means operates in combination with the nose structure and gun for dispensing the fasteners on a one at a time sequential basis.

More particularly, magazine 19 comprises a back wall 21 having a slot 22 therein. The back wall terminates in a bottom flange 23. The bottom portion of flange 23 is set off to one side to enable a follower controller 24 to extend downwardly below the bottom flange 23. The magazine 19 is further defined by front wall 26 and by a side wall 27 visible through slot 22.

Means are provided for forcing the fasateners toward the nose structure. More particularly, a follower 28 is fastened to the upper portion of the follower control 24. The follower 28 is shown as comprising a solid piece of material slidably contained between the three walls of the magazine. The front and rear walls 26 and 21, respectively, of the magazine have side flanges 31 and 29, respectively, which extend over the normally opened side of the magazine as best seen in FIG. 1. The flange portion enables the follower control 24 to slide within the confined enclosure of the magazine against the flanges 29 and 31.

Means such as spring 32 are provided for continuously exerting a force on the fasteners such as fasteners 33 through follower 28 to force the fastener into the nose structure.

The fasteners, such as 33, are mounted on a carrier 34. To load the magazine, control 24 which has a bottom hook portion 36 is pulled down to the point where the follower 28 rests against the bottom flange 23. The flanges 29 and 31 terminate a fixed distance above bottom flange 23 to provide an expanded opening 37. The expanded opening 37 at the bottom of the magazine 19 is sufficiently large to enable placing carrier 34 loaded with fasteners into the confined enclosure of the magazine above the follower 28. It should be understood that the carrier 34 is flexible, which makes the loading poasible without having the opening 37 extraordinarily large. The follower upon being released is forced upward against the bottom of the carrier 34 by spring 32. Spring 32 may be connected to the follower 28 in any well known manner such as through the use of threaded fasteners 38. Similarly, control 24 is also connected to the follower 28 in any well known manner such as through the use of pin arrangement 39. The follower 28 forces the carrier 34 upward until the fasteners abut against the cover plate 41 of nose structure 18.

The nose structure 18 comprises a cover plate 41 which rests on a guide plate 42 that is sandwiched between top plate 43 and bottom plate 44. The plates of the nozzle are held together through the use of any well known fasteners such as the threaded fasteners 45 which pass through apertures in the cover plate and thread into threaded holes in the guide plate 42.

Figure 8:
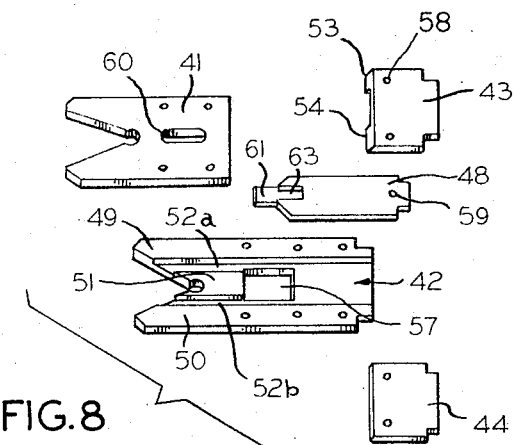
FIG. 8 is an exploded showing of a nose structure used in the fastener guide means.

As best seen in FIG. 5, an embodiment of the carrier 34 is shaped to resemble a figure 8. This shaped carrier was used in the past with the smaller fasteners having generally oval openings therein. It has been found that with this shape there is less likelihood of the fasteners nesting while they are being placed on the carrier. If the fasateners have generally rectangular openings. The carrier 34 further may be made of a thermoplastic material such as the well known polypropolene used as the basic material of many tubes. The carrier 34 is flexible, and therefore, facilitates loading into said machine. It should be understood that while carrier 34 is shown as a tube, it could be a rod or a pair of tubes or rods. Also, the cross sectional shape could be circular or rectangular. The guiding criteria is that the carrier can be loaded with fasteners with relative ease and retain the fasteners for a one-at-a-time disbursement of the fasteners.

The nose structure 18 is retained within the piston portion of the gun in any well known manner. For example, protrusions 46,47 are provided having a slot therein which is designed to receive the nose structure 18 and the nose structure is retained therein in any well known manner, such as through the use of clamp screw 46a which can be tightened against top plate 43. The nose structure 18 when in place on the piston portion of the gun is aligned to receive the driver of the gun. Also fasteners (not shown) may pass through apertures 58 of top plate 43 and the apertures of the nose structure aligned therewith to thread into threaded holes (not shown) in portion 47 of the gun. A portion of the driver 48 of the nose structure is shown in FIG. 6 and the complete driver is shown in the exploded view of FIG. 8.

In FIG. 1 it is seen that the rear of cover plate 41 abuts the front of top plate 43. The guide plate 42 comprises a pair of raised peripheral ledges 49, 50 at each side thereof. Also, a raised guide portion 51 is provided. The dimensions of the raised guide portion 51 are such that the faatener 33 slidably fits thereover with the downward extending edges 33a, 33b of the fastener fitting over the ledge 51, reaching into grooved slots 52a, 52b located on either side of raised guide portion 51 on guide plate 42. The top plate 43 may have raised ledges 53, 54 conforming to raised ledges 49, 50 of the guide plate 42, respectively.

Normally, the driver rests between the top plate and the guide plate. Means are provided in the guide plate such as aperture 57 through which the carrier 34 can project with the surfaces of the topmost fasteners 33 abutting cover plate 41 thus positioning the fasatener 33 into the line of travel of the reciprocating driver. The reciprocating driver moves to the front of the nose structure within the groove defined by the ledges 49, 50 to abut the fasteners 33 and force the fasteners 33 onto the raised guide portion 51 at the same time breaking or cutting the carrier tube 34 against the edge of the guide plate aperture. When the drive plate is withdrawn, the topmost fastener on carrier 34 is once again forced to abut cover plate 41 thereby aligning the next fastener 33 for operation thereon by driver 48. The carrier extends through hole 60 positioned to be sheared by the periphery of the aperture in the guide plate that is contiguous to the driver. When the unsheared portion of the carrier extends through hole 60 the previously sheared portion is forced out. If the gun is in a position whereby the hole 60 is not on a horizontal plane, then the previously sheared portion will fall out due to the force of gravity prior to being forced out.

The top plate and bottom plate 43, 44 are respectively held contiguous to guide plate and are used for fastening the nose structure to gun 10. The guide plate and top and bottom plates are held together with any well known fasteners, such as pins or rivets (not shown) driven through the apertures 58 in the guide plate and bottom plates.

Means including aperture 59, for example are provided for attaching the driver to the drive piston of the gun. The driver is preferably fabricated from spring steel. A typical example of a driver is shown in FIG. 8. It comprises lead section 61 shown protruding from the main body section 62. The lead section 61 engages the fasteners 33 to force them from the nozzle into the material being assembled. The rear thickness of the drive plate substantially fills the space defined by the cover plate and the guide plate between the peripheral ledges 49, 50.

The leading edge 61 fits over the raised guide portion 51. A grooved section 63 conforms to guide portion 51 and enables the driver to clear the raised guide portion 51 while the fastener is being forced from the nose structure. An aperture, such as aperture 60 can be provided in the top plate to enable the sheared portion 34 to escape. Aperture 60 is large enough for rod 34 to pass therethrough but not large enough for fastener 33 to pass therethrough. The magazine follower forces the carrier through the aperture 57 in the guide plate so that the fastener abuts against cover plate 41.

Means, such as an attachment plate 64 is used to couple the magazine to the nose structure. Similarly, a gun connecting plate 66 may also be used in conjunction with the nose structure connecting plate 64 to reliably hold the magazine in position.

Figure 9:
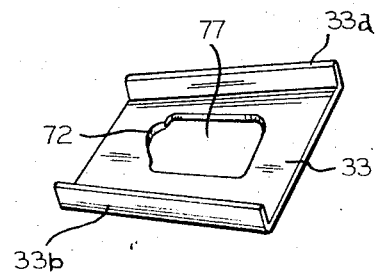
FIG. 9 is a perspective view of the fastener showing the shape of its central aperture by which it is mounted onto the carrier.

FIG. 9 shows the improved version of my fastener 33. More particularly, as can be seen in FIG. 9, the elongated central hole 77 is generally rectangular in shape, i.e. has four straight sides joined at right angles, and has a further extended portion 72 at one side, for example, at the rear thereof.

Figure 10:
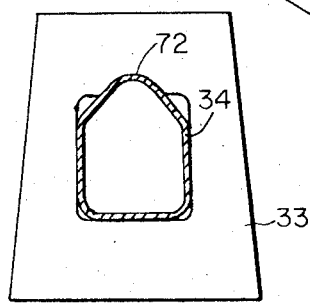
FIG. 10 is a plan view of the fastener on the carrier.

The extended portion 72 of aperture 77 as shown in FIGS. 9 and 10 preferably is an arcuate section having its center on the line longitudinally bisecting the central hold about ten percent of its length. As shown in FIG. 6, the carrier 34 is sized to fill the central hole and the extended portion. When the carrier has an arcuate cross section, its flexibility enables it to assure the shape of the central aperture. The generally rectangular shape plus the extended portion of the aperture faciliItates the passage of the fasteners and especially the larger fasteners over the carrier and therefore enables speedier loading of the carrier as well as decreases the tolerance requirements of the carrier.

While the principles of the invention have been described above in connection with specific apparatus and applications, it is understood that this description is made only by way of example and not as a limitation in the scope of the invention.

Having thus described my invention, what I claim and desire to secure by Letters Patent in the United States, is:

1. The combination of an apertured fastener for securely joining material sections together and a flexible carrier tube for holding a plurality of said apertured fasteners used in fitting the fasteners onto automated drive tools said fastener comprising a body section having a leading end and a trailing end, a peripheral wall depending from each side of said body section to form a channel-like unit, said body section having a centrally located aperture therein.

said aperture being generally rectangular in shape having three substantially straight sides, the fourth side of said aperture including a centrally located arcuate extension of the main aperture, and said carrier tube conforming to said generally rectangular shaped aperture with said extended portion so as to be contiguous with all sides of said aperture including the extended portion, the extended portion facilitating mounting said fasteners on the carrier and preventing the fasteners from jamming on said carrier while being driven from said automated drive tool.

2. The combination of claim 1 wherein the side of the aperture having the arcuate extension has sections extending from each of the two contiguous sides, said sections being substantially parallel to the side of said aperture opposite said side having the arcuate extension, and said sections being separated by said arcuate extension.

3. The piece part carrier arrangement of claim 1 wherein the extended portion of said aperture is at the rear thereof.

4. The combination of claim 1 wherein said carrier tube is fabricated from thermoplastics.

* * * * *

UNITED STATES PATENT OFFICE
CERTIFICATE OF CORRECTION

Patent No. 3,856,139  Dated December 24, 1974

Inventor(s) Hugh Black

It is certified that error appears in the above-identified patent and that said Letters Patent are hereby corrected as shown below:

| | |
|---|---|
| Col. 1, line 29 | After "inherently","jointed" should be -- joined -- |
| 34 | After "gun" "is" should be -- in -- |
| 24 | After "the" "problems" should be -- problem -- |
| 56 | Before "onto" "fasener" should be -- fastener -- |
| 66 | Before "guide" "fatner" should be -- fastener -- |
| Col. 2, line 35 | Before "guide" "fasatener" should be -- fastener -- |
| 52 | Before "toward" "fasateners" should be -- fasteners -- |
| Col. 3, line 12 | Before "without" "poasible" should be -- possible -- |
| 34 | Before "while" "nesting" should be -- jamming -- |
| Col. 4, line 1 | After "the" "faatener" should be -- fastener -- |
| line 12 | Before "33" "fasatener" should be -- fastener -- |
| line 36 | After "plate" "and top" should be deleted. |

Signed and sealed this 27th day of May 1975.

(SEAL)
Attest:

RUTH C. MASON
Attesting Officer

C. MARSHALL DANN
Commissioner of Patents
and Trademarks